United States Patent [19]

Columbus et al.

[11] 4,225,496
[45] Sep. 30, 1980

[54] ACRYLIC LATEX COVE BASE CEMENT

[75] Inventors: Peter S. Columbus, Whitestone; John Anderson, Brooklyn, both of N.Y.

[73] Assignee: Borden, Inc., Columbus, Ohio

[21] Appl. No.: 819,467

[22] Filed: Jul. 27, 1977

[51] Int. Cl.$^3$ ............................ C08K 3/22; C08K 3/26
[52] U.S. Cl. ..................... 260/29.6 M; 260/29.6 MM; 260/29.6 S
[58] Field of Search ............... 260/29.6 PS, 29.6 MM, 260/29.6 M

[56] References Cited

U.S. PATENT DOCUMENTS

| | | | |
|---|---|---|---|
| 3,256,229 | 6/1966 | Janota et al. | 260/29.6 S |
| 3,655,594 | 4/1972 | Medica et al. | 260/29.6 M |
| 3,749,692 | 7/1973 | Scocos | 260/29.6 PS |
| 3,854,267 | 12/1974 | Weiant et al. | 260/29.6 S |

OTHER PUBLICATIONS

UCAR Latex 153, Union Carbide Corp., Oct. 1970.
UCAR Vehicle 4150, Union Carbide Corp., Jan. 1970.

Primary Examiner—James H. Derrington
Attorney, Agent, or Firm—George P. Maskas; Daniel D. Mast; Kenneth P. Van Wyck

[57] ABSTRACT

The cement is composed of the following principal ingredients on weight percent basis: 20 to 40% acrylic resin, 40 to 60% calcium carbonate filler, 5 to 15% clay filler and enough water to give viscosity at 25° C. of about 150,000 to 600,000 cps.

12 Claims, No Drawings

ACRYLIC LATEX COVE BASE CEMENT

This invention relates to acrylic latex cement specially formulated for the installation of vinyl, rubber and asphalt cove base. This cove base cement spreads easily, grabs fast, gives strong and water-resistant bonds, is white in color and has a pleasant solvent-free odor. Unlike most solvent type cove base cements, it is non-flammable and non-toxic, as defined by the Federal Hazardous Substances Act, and is easy to remove from hands, tools and other materials with a damp cloth before it dries. It is a high quality, ready-to-use, water-based product.

The cove base cement described herein is prepared from the following essential ingredients, which are given in weight percent:

|  | Preferred | Broad |
|---|---|---|
| acrylic binding resin, on solids basis | 27–33 | 20–40 |
| calcium carbonate filler | 48–55 | 40–60 |
| clay filler | 8–12 | 5–15 |
| water | sufficient water to give viscosity of about 150,000 to 600,000 preferably 300,000 to 340,000 cps. at 25° C. | |

The acrylic resin is essentially an acrylate or a mixture thereof which is derived from an acrylic emulsion which can be prepared from resiliency imparting or soft monomers as represented by the following structural formula:

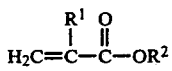

where $R^1$ is H or an alkyl group of 1 to 4 carbon atoms and $R^2$ is a straight chain or branched chain alkyl radical containing from 1 to about 14 carbon atoms. Examples of $R^2$ include methyl, ethyl, propyl, n-butyl, 2-ethylhexyl, hexyl, heptyl, octyl, 2-methylbutyl, 1-methylbutyl, 2-methylpentyl, n-hexylisobutyl, decyl, dodecyl, etc. To further define the preferred soft monomer, when $R^1$ is H or a methyl alkyl radical, $R^2$ should contain 2 to 14 carbon atoms; and when $R^1$ is alkyl of 2 to 4 carbon atoms, alkyl radical $R^2$ should contain from 6 to 14 carbon atoms.

As is known, for a given number of carbon atoms in an organic moiety, the extent and type of branching markedly influences the $T_g$, the straight chain products giving the lower $T_g$. $T_g$ is a conventional criterion of polymer hardness and is directly related to the minimal film-forming temperature of an acrylic dispersion in that at the $T_g$ point, the affinity of the dispersed polymer particles for one another is increased to the effect that they coalesce forming a continuous film.

As is apparent, an important property of the binder polymer is the $T_g$ thereof and minimal film-forming temperature of its dispersion. The $T_g$ and the minimal film-forming temperature of its dispersion are closely related both numerically and in respect to its efficacy. Consequently, the selection of monomers and proportions thereof for specific end uses depends upon their influence on the $T_g$ and the minimal film-forming temperature. For applications where flexibility is required, as in this case, the $T_g$ of the polymer should be about −30° C. to +15° C., preferably below 0° C. and is more preferably between −5° C. and −15° C. Examples of $T_g$ for the more common homopolymers are given below which can be blended, if desired, to produce a resin of the desired $T_g$:

| Homopolymers | $T_g$ in °C. |
|---|---|
| ethyl acrylate | −23 |
| n-octyl acrylate | −80 |
| n-decyl methacrylate | −60 |
| 2-ethylhexyl acrylate | −70 |
| n-butyl acrylate | −56 |
| octyl methacrylate | −20 |
| n-tetradecyl methacrylate | −9 |
| methyl acrylate | 9 |
| N-tetradecyl acrylate | 20 |
| t-butyl acrylate | 43 |
| methyl methacrylate | 105 |
| acrylic acid | 106 |

The acrylic resins used in preparing our cove base cement are in the form of aqueous acrylic emulsions. Preferred acrylic emulsions are milky white in color wherein the average resin particle size is about 0.45 to 0.55 of a micron in diameter. Many different types of Rhoplex TM acrylic emulsions are sold by Rohm and Haas. Of these, Rhoplex LC-45 acrylic emulsion, which has about 65% solids and is essentially polymerized ethyl acrylate, is preferred. It provides good flexibility and good wet tack. Rhoplex LC-45 acrylic emulsion is thermoplastic, has low shrinkage and good adhesion to many substrates. This emulsion has pH of about 4.8, specific gravity of about 1.05, viscosity at 25° C. of 700±350 cps, and its colloidal charge is anionic. Its minimal film-forming temperature is less than 2° C., $T_g$ of −10° C. and Tukon hardness (KHN) of less than 1.

A small amount of an acid can be used in preparing these acrylic emulsions. Such acids are selected from unsaturated mono or polycarboxylic acids, examples of which include sorbic, acrylic, acryloxy-acetic, cinnamic, maleic, fumaric, crotonic, itaconic, etc. The alpha-beta unsaturated monocarboxylic acids are preferred, especially acrylic and methacrylic acids. On the basis of dry resin in the emulsions, amount of the acid can vary from about 0.2 to 5%, preferably from 0.5 to 3%. A small amount of about 1 to 3% of a nitrogenous compound can also be used in the preparation of the acrylic emulsions. An example of such a nitrogenous compound is dimethylaminomethyl methacrylate which acts as a softening monomer and as a stabilizer. Other lower alkylamino lower alkyl acrylates and methacrylates as well as other nitrogenous compounds can be used as is known in the art.

An essential ingredient in the cove base cement described herein is calcium carbonate filler. Preferred is Cameltex TM calcium carbonate filler which is sold by H. T. Campbell Company. This filler has a top particle size of 25 microns, 78% thereof has a particle size of less than 10 microns and 54% of it has a particle size less than 5 microns. Its average particle size is about 5 microns, index of refraction of 1.6, specific gravity of about 2.70, pH of saturated solution is about 9.5, and oil absorption or rub out of 14 cc/100 g. Any other suitable calcium carbonate filler can also be used. Chemcarb #55, which has a mean particle size of 12 microns and oil absorption of 5 to 6, was tried in place of Cameltex but proved inferior in terms of viscosity and drying properties. This may be due to the fact that Chemcarb #55 is of larger particle size, which is probably responsible for lower viscosity, and has lower oil absorption. Chemcarb #55 filler is sold by Engelhard Minerals and Chemicals Corporation.

The clay filler is preferably ASP 400 aluminum silicate clay which can be obtained from Engelhard Minerals and Chemicals Corporation. Its presence in the cove base cement formulation provides proper pseuodo-plasticity, i.e., flow or reheological properties. It has relatively large particle size, the average being about 5 microns. About 90% of this clay is smaller than 17 microns and about 10% is smaller than 1.6 microns. Its pH is 3.8 to 4.6 and oil absorption is 28 to 32.

Enough water is used in the preparation of the cove base cement to obtain a relatively heavy consistency which in the preferred embodiment translates into a Brookfield viscosity of about 300,000 to 340,000 cps and generally 150,000 to 600,000 cps measured at 25° C.

Other ingredients are also added to the cove base cement formulation, as is known in the art. Included among such ingredients are pigments, pigment dispersants, extenders, preservatives, surfactants, defoamers, thickeners, etc.

In a preferred embodiment, the cove base cement has a viscosity of about 300,000 to 340,000 cps (Brookfield RVF #7/4 rpm at 25° C.), pH of about 7.9 to 8.7 and solids of about 80 to 83%.

Preparation procedure for the cove base cement is quite straight forward. The ingredients are added to a blender and mixed until a smooth and a homogeneous dispersion is obtained, which may take about one hour. Extra precaution is applied to add thickener very slowly with agitation.

Surfaces to which the cove base cement is to be applied should be sound, clean, dry, and be free of oil, grease and loose particles. Wallpaper, calcimine and all other water-soluble coatings should be removed. Painted or varnished surfaces should be roughened or scored to remove glaze and expose sub-surface to facilitate formation of a firm lasting bond. The surfaces and the cove base cement should be at a temperature of 50° F. or warmer.

The cove base cement is applied to cove base or wall surface with a 1/16 or 1/18 inch notched trowel. The cove base is then pressed firmly into place while the cement is still tacky. Depending upon temperature, humidity, surface porosity and amount applied, the cove base cement should remain tacky for about 10 minutes. For this reason, one should not apply more cement than can be covered in about 10 minutes. Should cove base pull away from the wall, temporarily brace it until the cement develops strength. The container should be closed after each use. A damp cloth can be used to clean-up before the cement dries.

Preparation of the cove base cement described herein will now be illustrated by an example showing the use of exact amounts of ingredients.

EXAMPLE I

The following are ingredients for preparing a specific formulation for a cove base cement described herein, given in weight percent:

| | |
|---|---|
| (1) 65% solids Rhoplex LC-45 acrylic emulsion | 29.62 |
| (2) Triton X-405 non-ionic-surfactant | 0.64 |
| (3) water | 6.40 |
| (4) Givgard DXN preservative | 0.10 |
| (5) Tamol 850 dispersant and stabilizer | 0.20 |

-continued

| | |
|---|---|
| (6) anhydrous potassium tripolyphosphate | 0.39 |
| (7) propylene glycol | 0.74 |
| (8) Methocel E4M thickener | 0.15 |
| (9) Cameltex calcium carbonate filler | 51.34 |
| (10) ASP aluminum silicate clay | 9.87 |
| (11) Nopco NXZ non-ionic surfactant | 0.05 |
| (12) water | 0.50 |
| | 100.00 |

Triton X-405, sold by Rohm and Haas, is octylphenoxypolyethoxy ethanol nonionic surfactant. Givgard DXN preservative can be obtained from Givaudan Corporation and is a dimethoxane, i.e., 6-acetoxy-2,4-dimethyl, m-dioxane which is present in amount of about 92% with about 8% of inert ingredients. The preservative function of Givgard DXN relates to can stability. Tamol 850, a sodium salt of glacial methacrylic acid sold by Rohm and Haas, is a 30% aqueous dispersant and stabilizer for pigments and extenders in aqueous systems. Potassium tripolyphosphate serves as a dispersing agent for the fillers. Propylene glycol is used to retard drying and to impart freeze-thaw stability. Methocel E4M, sold by Dow Chemical, is hydroxypropyl methyl cellulose thickener. Nopco NXZ is a defoamer which can be obtained from Nopco Chemical Company.

The procedure for preparing the cove base cement is as follows: to a clean and dry fiberglass bin equipped with a bow tie blade is added (1). At slow agitation with the blade sitting at the bottom of the bin items (2), (3), (4), (5) and (6) are added. Item (6) is sprinkled in. The blade is raised closer to the surface but still therebelow and predissolved items (7) and (8) are added slowly with medium agitation which is continued for 5 minutes. With slow agitation, items (9) and (10) are added with care to avoid lumping. Item (11) is then added and slow agitation is continued for about one-half hour until the cement dispersion is smooth and homogeneous. At this point a sample of the cement is removed for a viscosity test. If necessary, item (12) is added to the dispersion to adjust the viscosity. The resulting cove base cement will have the following physical properties:

viscosity—300,000 cps Br. RVF #7/4 rpm at 25° C.
ph—8.3
solids—81.5%

We claim:

1. Cove base cement composition which spreads easily, grabs fast, gives strong and water resistant bonds, has a pleasant solvent-free odor, and is non-flammable and non-toxic, said composition comprising, on weight percent basis, 20 to 40% acrylic resin solids comprising polymerized acrylate esters, 40 to 60% calcium carbonate filler, 5 to 15% clay filler and enough water to yield a product having Brookfield viscosity of about 150,000 to 600,000 cps at 25° C.

2. Composition of claim 1 wherein the average particle size of the calcium carbonate filler is about 5 microns and that of the clay filler is also about 5 microns, the clay filler being aluminum silicate and the acrylic resin is prepared from monomers selected from those having the following structural formula:

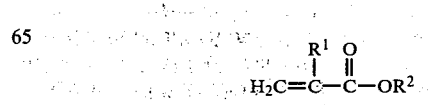

and mixtures thereof; wherein $R^1$ is H or an alkyl group of 1 to 4 carbon atoms and $R^2$ is an alkyl group containing 1 to 14 carbon atoms.

3. Composition of claim 2 wherein the preferred resin is defined as follows: When $R^1$ is H or methyl, $R^2$ contains 1 to 14 carbon atoms whereas when $R^1$ is alkyl of 2 to 4 carbon atoms, then $R^2$ is alkyl of 6 to 14 carbon atoms.

4. Composition of claim 3 wherein the resin is also prepared with an alpha-beta unsaturated monocarboxylic acid in amount of about 0.2 to 5%, based on the weight of the resin, to aid in cross-linking.

5. Composition of claim 3 wherein $R^1$ is H or methyl and $R^2$ is selected from alkyl groups of 1 to 8 carbon atoms.

6. Composition of claim 5 wherein amounts of the ingredients are: 27 to 33% acrylic resin, 48 to 55% calcium carbonate filler and 8 to 12% clay filler.

7. Composition of claim 6 wherein the acrylic resin has $T_g$ of about $-30°$ C. to $+15°$ C., is in emulsion form and is composed essentially of ethyl acrylate.

8. Composition of claim 6 wherein the resin has $T_g$ of about $-5°$ to $-15°$ C., the calcium carbonate filler has a top particle size of about 25 microns and about 90% of the clay filler is smaller than 17 microns.

9. Composition of claim 6 having viscosity of about 300,000 to 340,000 Brookfield RVF #7/4 rpm at 25° C., pH of about 8.3±0.4 and solids of about 81.5±1.5.

10. Cement for adhering vinyl, rubber and asphalt cove base to a wall surface which spreads easily, has fast grab, gives strong and water resistant bonds, has a pleasant solvent-free odor, is non-flammable and non-toxic, said cement consisting essentially of, on weight percent basis, 20 to 40% acrylic resin solids, 40 to 60% calcium carbonate filler, 5 to 15% clay filler and enough water to yield a product with a Brookfield viscosity of about 150,000 to 600,000 cps at 25° C.

11. Cement of claim 10 wherein amounts of the ingredients are: 27 to 33% acrylic resin solids, 48 to 55% calcium carbonate filler and 8 to 12% aluminum silicate clay filler, the cement also includes 0.2 to 5% of an alpha-beta unsaturated monocarboxylic acid, based on the weight of dry resin, and an effective amount of a nitrogenous compound as a stabilizer, and the acrylic resin is prepared from soft monomers selected from the following:

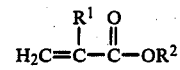

wherein $R^1$ is H or methyl and $R^2$ is selected from alkyl groups of 1 to 8 carbon atoms.

12. Cement of claim 11 having viscosity of about 300,000 to 340,000 Brookfield RVF #7/4 rpm at 25° C. and a solids content of about 80 to 83%, wherein the acrylic resin has Tg of about $-5°$ to $-15°$ C. and is in emulsion form having average resin particle size of about 0.45 to 0.55 of a micron in diameter, and the average particle size of the calcium carbonate and the clay fillers is about 5 microns.

* * * * *